J. SUMMERSON.
TIRE.
APPLICATION FILED AUG. 31, 1918.
1,296,874.
Patented Mar. 11, 1919.
2 SHEETS—SHEET 2.
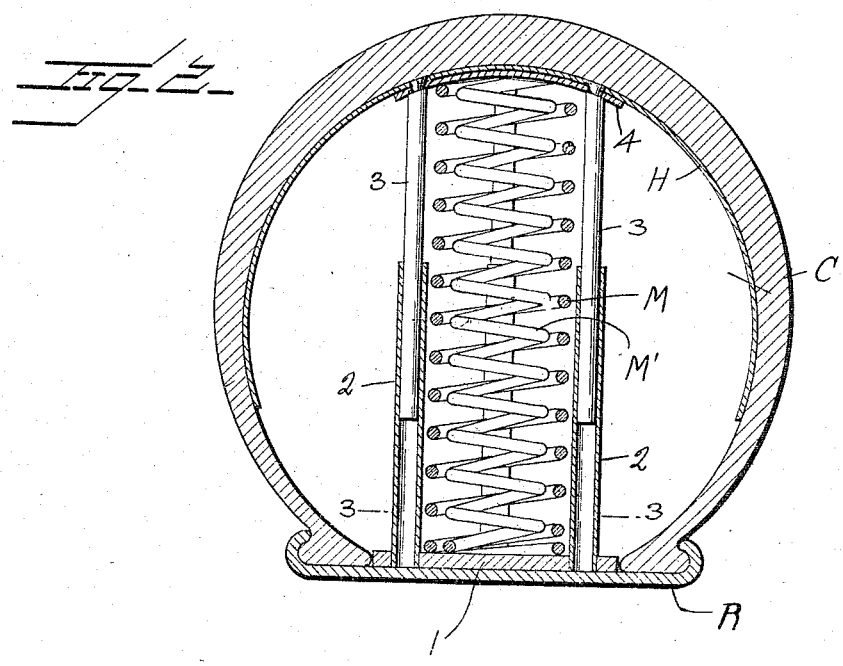
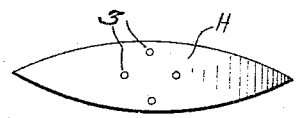
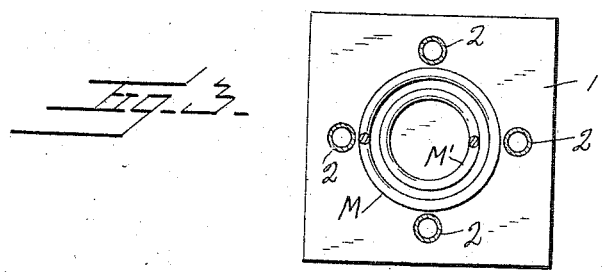
Inventor
J. Summerson
By Watson E. Coleman
Attorney

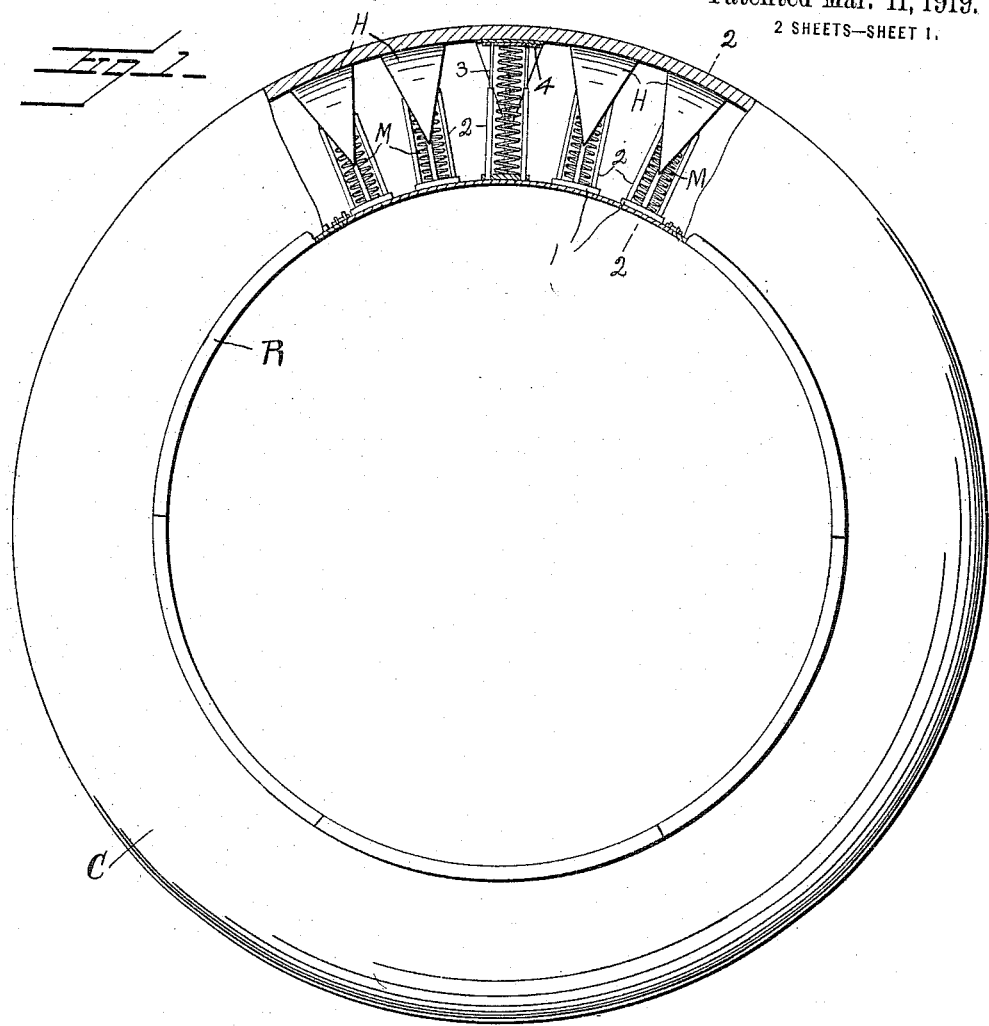
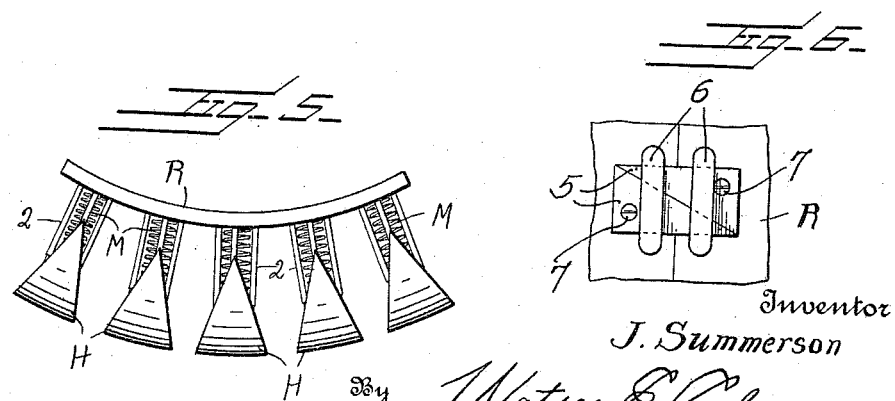

UNITED STATES PATENT OFFICE.

JAMES SUMMERSON, OF EMPORIUM, PENNSYLVANIA.

TIRE.

1,296,874.   Specification of Letters Patent.   Patented Mar. 11, 1919.

Application filed August 31, 1918. Serial No. 252,231.

*To all whom it may concern:*

Be it known that I, JAMES SUMMERSON, a citizen of the United States, residing at Emporium, in the county of Cameron and State of Pennsylvania, have invented certain new and useful Improvements in Tires, of which the following is a specification, reference being had to the accompanying drawings.

This invention relates to certain improvements in tires and has relation more particularly to a tire of a cushion type, and it is an object of the invention to provide a tire of this general character having novel and improved means whereby the shocks and jars incident to travel are substantially eliminated.

It is also an object of the invention to provide a novel and improved tire of this general character embodying a plurality of yieldingly supported and outwardly urged members adapted to be inclosed within a tire casing or carcass of any desired type and whereby said casing or carcass is maintained extended.

It is also an object of the invention to provide a novel and improved tire comprising a casing or carcass having a mechanical cushioning agency inclosed therein for maintaining the tire casing or carcass extended and wherein said agency comprises a plurality of separable sections to facilitate the assembly or derangement of the tire.

The invention consists in the details of construction and in the combination and arrangement of the several parts of my improved tire, whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation with a portion broken away of a tire constructed in accordance with an embodiment of my invention;

Fig. 2 is an enlarged transverse sectional view taken substantially on the line 2—2 of Fig. 1;

Fig. 3 is a sectional view taken substantially on the line 3—3 of Fig. 2;

Fig. 4 is a view in top plan of one of the heads herein embodied;

Fig. 5 is a detail side elevation of one section of the rim and the cushioning means carried thereby; and Fig. 6 is a fragmentary plan view illustrating the means for clamping the rim sections together.

As disclosed in the accompanying drawings, R denotes a rim formed of a plurality of sections and preferably consisting of six sections. Adjacent sections are adapted to be clamped or held in assembled relation by means of the wedge-shaped keys 5 which are driven in opposite directions through apertured lugs 6 formed on the opposed end portions of adjacent sections of the rim R. Preferably, set screws 7 are threaded in the ends of the keys for binding engagement with the rim R whereby the keys are securely held against relative shifting movement. A tire casing or carcass C is engaged with the rim R in a well known manner.

Welded or otherwise permanently secured to the outer face of the rim R are the base plates 1. The plates 1 are equidistantly spaced, circumferentially of the assembled rim, and with a rim of a size for use in connection with a 37"x5" casing or carcass.

Extending outwardly from each of the plates 1 is a plurality of tubular members or sleeves 2, preferably four in number, and arranged in two pairs. The members or sleeves of one pair are alined transversely of the rim R and the members of the second pair are alined circumferentially of the rim at a point substantially midway between the members of the first pair.

Telescopically engaged within the members or sleeves 2, are the inwardly directed rods or standards 3 carried by a resilient head H. The head H is substantially elliptical in form and is arranged longitudinally on a curvature to conform to the cross sectional configuration of the tread portion of the casing or carcass C.

The head H, when the tire is assembled, is constantly urged outwardly against the inner face of the tread portion of the casing or carcass C by the expansible members M and M' interposed between the plate 1 and a plate 4 fixed to the head H by means of the rods 3. As herein disclosed, the members M and M' comprise coil springs of requisite tension and with the member M' arranged within the member M. The members M and M' are also positioned within the field defined by the members or sleeves 2 and the rods or standards 3, and the sleeves 2 and the rods 3 are in such proximity to the outer member M to prevent effectually any buckling of the members M and M' which might otherwise occur should the tire be subjected to an unusual shock or jar. It is also to be understood that the members M and M' serve to impart the desired rigidity to the carcass or casing C so that the same will be maintained extended when under load and so that the members M and M' will compensate for or absorb the shocks and jars incident to travel. By constructing the rim R in sections, any one section of the rim R with the plates 1 and the cushioning means, may be removed for the purpose of repairing the same by simply removing the clamping keys 5. After the necessary repairs have been made, this section can be easily and quickly again inserted in assembled relation with the remaining sections.

From the foregoing description, it is thought to be obvious that a tire constructed in accordance with my invention is particularly well adapted for use by reason of the convenience and facility with which it may be assembled and operated and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

It is also to be noted that by having the clamping or holding means for the adjacent sections coacting with the outer faces of the sections, accidental derangement of said clamping or holding means is substantially eliminated, and which would not be true if said means had coaction with the inner faces of the sections. In practice I am assembling my improved tire by the use of a six or seven arm vise, and which instrument forms no part of my present invention. However, I am fully aware of the fact that other means may be provided or employed for assembling the tire.

I claim:—

1. Resilient cushioning means for wheel tires comprising a plurality of rim sections, cushioning means carried by each rim section and adapted to be inclosed within a tire casing seated upon said rim sections, said rim sections having apertured lugs on their opposed ends, and wedge-shaped clamping keys adapted for engagement through said lugs in relatively opposite directions to clamp the rim sections to each other.

2. Resilient cushioning means for wheel tires comprising a plurality of rim sections, cushioning means carried by each rim section and adapted to be inclosed within a tire casing seated upon said rim sections, said rim sections having apertured lugs on their opposed ends, wedge-shaped clamping keys adapted for engagement through said lugs in relatively opposite directions to clamp the rim sections to each other, and a set screw carried by each of said keys for binding engagement with one of the rim sections.

3. Resilient cushioning means for wheel tires comprising a plurality of rim sections, cushioning means carried by each rim section and adapted to be inclosed within a tire casing seated upon said rim sections, said rim sections having apertured lugs on their opposed ends, and wedge shaped clamping keys adapted for engagement through said lugs to clamp the rim sections to each other.

4. Resilient cushioning means for wheel tires comprising a plurality of rim sections, cushioning means carried by each rim section and adapted to be inclosed within a tire casing seated upon said rim sections, said rim sections having apertured lugs on their opposed ends, wedge shaped clamping keys adapted for engagement through said lugs to clamp the rim sections to each other, and means carried by each of the keys for binding engagement with one of the rim sections.

5. A tire of the class described comprising in combination, a rim, a casing engaged within the rim, heads contacting with the inner face of the casing at the tread thereof, members depending from each of the heads and arranged in two pairs, the members of one pair being alined transversely of the rim, and the members of the second pair alined circumferentially of the rim at a point substantially midway between the members of the first pair, correspondingly arranged members carried by the rim, the members of the head and the members of the rim being telescopically engaged, and an expansible member interposed between each of the heads and the rim.

6. A tire of the class described comprising in combination, a rim, a casing engaged within the rim, heads contacting with the inner face of the casing at the tread thereof, members depending from each of the heads and arranged in two pairs, the members of one pair being alined transversely of the rim, and the members of the second pair alined circumferentially midway between the members of the first pair, correspondingly arranged members carried by the rim, the members of the head and the members of the rim being telescopically engaged, an expansible member interposed between each of the heads and the rim, said expansible member being positioned within the field defined by the members, whereby said expansible member is held against buckling.

In testimony whereof I hereunto affix my signature in the presence of a witness.

JAMES SUMMERSON.

Witness:
M. M. LARRABEE.